April 27, 1965     O. J. STONE     3,180,324
ENGINE Filed May 3, 1963     4 Sheets-Sheet 1

Fig. 1.

INVENTOR.
OMER J. STONE
BY
Lockwood, Woodard, Smith & Weikart
Attorneys

April 27, 1965

O. J. STONE

3,180,324

ENGINE

Filed May 3, 1963

INVENTOR.
OMER J. STONE

BY
Lockwood, Woodard, Smith & Weikart
Attorneys

April 27, 1965      O. J. STONE      3,180,324

ENGINE

Filed May 3, 1963      4 Sheets-Sheet 3

INVENTOR.
OMER J. STONE

BY *Lockwood, Woodard, Smith & Weikart*
Attorneys

April 27, 1965  O. J. STONE  3,180,324
ENGINE

Filed May 3, 1963  4 Sheets-Sheet 4

INVENTOR.
OMER J. STONE

BY
Lockwood, Woodard, Smith & Weikart
Attorneys

United States Patent Office 3,180,324
Patented Apr. 27, 1965

3,180,324
ENGINE
Omer J. Stone, 219 S. Lemon St., Azusa, Calif.
Filed May 3, 1963, Ser. No. 277,780
16 Claims. (Cl. 123—25)

This invention relates generally to internal combustion engines and more particularly to an engine incorporating heat conservation and exhaust cleaning means.

While the mechanical efficiency and thermal efficiency of internal combustion engines has improved considerably since the original invention of such engines, there remains room for considerable improvement, particularly in thermal efficiency. Significant improvements in thermal efficiency have been achieved by elevating compression ratios. However, there is a practical limit to this and the fact that it requires premium fuels to continue to operate at high compression ratios tends to offset, to some extent, the advantages gained. There has also been considerable effort directed to solving the air pollution problem which it attributable in some measure to internal combustion engines. In certain areas, internal combustion engines are a major factor in air pollution.

It is, therefore, a general object of this invention to improve the efficiency of an internal combustion engine.

A further object is to provide means for increasing the power capability of a given size of internal combustion engine.

A further object is to minimize or eliminate air pollution resulting from internal combustion engine operation.

A further object is to provide means achieving the foregoing objects and yet avoiding excessive cylinder pressure and providing a greater average pressure for a longer duration than is achieved in conventional engines.

Described briefly, a typical embodiment of the present invention includes a heat exchanger coupled to the engine exhaust manifold, this heat exchanger providing superheated water for injection into the engine cylinders. A combined hydraulic fluid pump and water pump is driven by the engine and supplies water to the heat exchanger and supplies hydraulic pressure to a set of injectors mounted to the engine. Means are provided whereby the hydraulic fluid controls the injection of superheated water into the cylinders of the engine according to engine requirements. The exhaust is cooled and filtered before a portion thereof is released to atmosphere.

The full nature of the invention will be understood from the accompanying drawings and the following description and claims.

Figure 1:
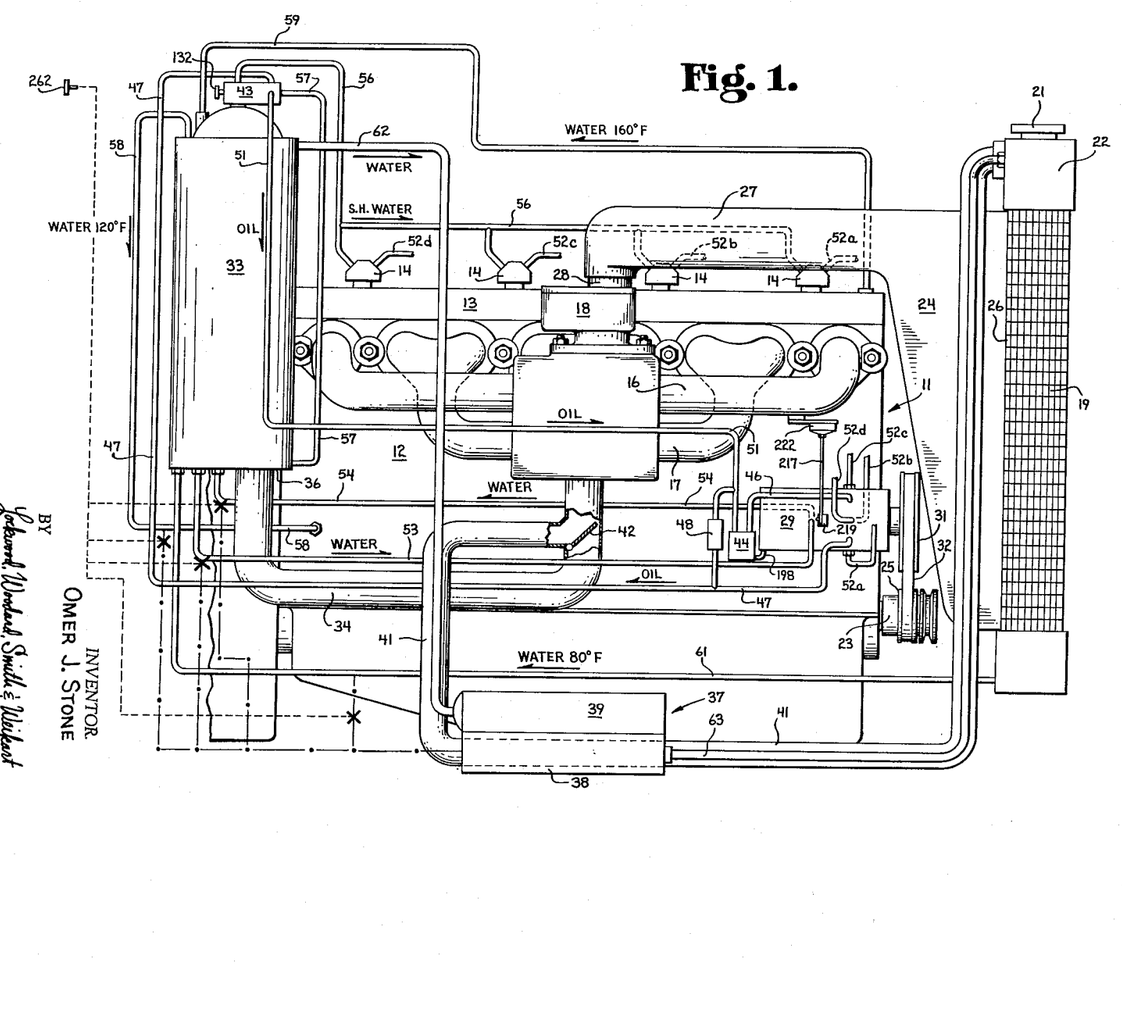
FIG. 1 is a side elevation of a typical embodiment of the present invention.

Referring to the drawings in detail, and in particular to FIG. 1, a four cylinder inline engine 11 is shown for purposes of convenience. The illustrated engine may be considered to be of the L-head type having a cylinder block 12 with a cylinder head 13 mounted thereon, with the injectors 14 of the present invention mounted in the same position that spark plugs are usually mounted in a conventional engine.

The engine includes the usual intake manifold 16 and exhaust manifold 17. A carburetor 18 is provided in the usual manner for distribution of fuel-air mixture through the intake manifold 16. A conventional radiator 19 is provided having a pressure cap 21 on the upper tank 22 thereof. The engine is provided with crankshaft pulley member 23 useful to drive any accessories desired such as a radiator fan if desired, steering pump, generator, air conditioning compressor, or other accessories, none of these being shown, however.

The portions of the engine described thus far may be substantially conventional with the exception, however, of the injectors 14 and a sprocket or gear belt pulley 25 mounted on the pulley member 23. According to the present invention, an enclosure 24 is connected to the rear of the radiator and receives all of the air from the rear face 26 of the radiator core. This air is then channeled through the conduit 27 to the carburetor inlet 28. Accordingly, the air leaving the radiator enters the carburetor 18 thus assuring adequate air flow through the radiator even when the engine is idling. If it is desired to use a cooling fan, the enclosure 24 and conduit 27 would be omitted.

An injection and distribution pump 29 is mounted to the engine and has an input shaft driven by the sprocket or gear belt pulley 31 and chain or gear belt 32 driven by the engine pulley 35. The pulley 31 must be driven at one-half the engine crankshaft speed in four stroke cycle engines. Also, the rotational relationship of the pulley 31 to the pulley 25 must be maintained within predetermined constant limits. In order to maintain these conditions, it is necessary to use either a timing belt or a chain belt on these pulleys. A gear drive could be used if desired.

A heat exchanger 33 is mounted to the engine and the engine main exhaust pipe 34 enters the lower end 36 of the heat exchanger.

A combined filter and freeze tank 37 is provided, the lower portion 38 of which is the freeze tank and the upper portion 39 of which is the filter portion. A thaw line 41 connected to the exhaust pipe 34 enters the freeze tank 38. A manually operable damper 42 is provided in the exhaust pipe to permit alternative passage of the exhaust gases through the thaw line or through the exhaust pipe to the heat exchanger.

A thermo safety valve 43 is mounted to the top of the heat exchanger 33 for purposes which will become apparent as the description proceeds.

A good quality of hydraulic fluid is used in this invention to control the injection of water into the engine cylinders. For convenience of discussion, this fluid will hereinafter be referred to generically as oil. It is in no way connected wtih the engine oiling system.

An oil storage reservoir 44 supplies oil to the pump 29 through the line 46. A high pressure oil line 47 from the pump supplies oil to the thermo safety valve 43. A pressure regulator valve 48 is provided in the bypass line 49 to the oil return line 51 and this valve can be adjusted to establish a maximum oil pressure produced by the pump. High pressure injector control lines 52a, 52b, 52c and 52d provide oil pressure to the injectors mounted on the first, second, third and fourth cylinder respectively, the cylinders being numbered beginning at the front end of the engine.

The pump 29 receives pre-heated water from the heat exchanger 33 by way of the line 53. It returns this water under pressure to the heat exchanger by means of the line 54. This water is superheated in the heat exchanger, is released by valve 43 and passes through the superheated water feed line 56 to the injectors. A thermo safety bypass line 57 is provided from the valve 43 to the lower end portion of the heat exchanger.

Water from the heat exchanger to the cylinder block is conveyed by the line 58 whereas water from the cylinder head to the heat exchanger is conveyed by the line 59. Water is supplied from the radiator lower tank to the heat exchanger by means of the line 61. Water passes from the heat exchanger through the line 62 to the filter chamber 39. Filtered water passes from the freeze tank 38 through the line 63 to the upper tank of the radiator. The thaw line 41 passes through the freeze tank 38 and enters the top tank 22 of the radiator..

Figure 2:
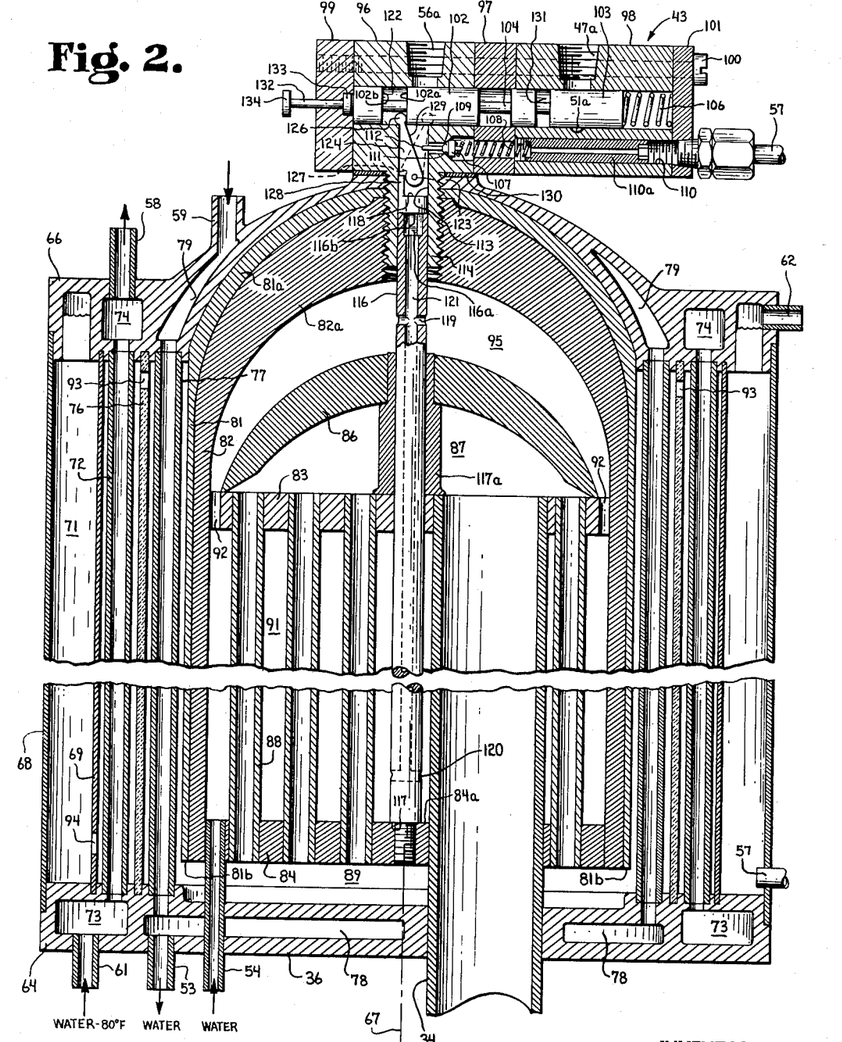
FIG. 2 is an enlarged vertical section of the heat exchanger of the present invention, with a portion being broken away to conserve space in the drawing.

Referring now particularly to FIG. 2, a typical construction of the heat exchanger is illustrated. It includes a base 64 and a cover 66. It further includes a number of elements which are substantially symmetrical with respect to the axis 67. An outer wall 68 extends completely around the heat exchanger and therefore forms a cylindrical shell. The second wall 69 likewise forms a cylindrical shell and these cooperate to provide the annular chamber 71. This chamber is normally filled with water which rises to a level meeting the lower inside surface of the outlet line 62. During normal operation, this water is at a comparatively low temperature which may be of the order of 100° Fahrenheit.

A circular array of water tubes 72 is provided. These tubes are normally round and the axes thereof are located in a circle concentric with the axis 67. Each of the tubes 72 communicates with an annular chamber 73 formed in the base and each of the tubes communicates with an annular chamber 74 formed in the top header 66. The chamber 73 is supplied with water from the radiator by means of the line 61. This water may be at a temperature of 80° Fahrenheit for example. The water passing up through the tubes 72 into the chamber 74 may be heated to a temperature of approximately 120° for example. It then leaves by way of the line 58 to enter the cylinder block 12.

A cylindrical insulator plate 76 is provided radially inwardly from the array of pipes 72. This insulator plate should be made of a material which is not likely to be damaged either by contact with exhaust gases having temperature of the order of 800° Fahrenheit, or by contact with water.

Another circular array of water tubes 77 is provided. These tubes are usually circular in cross section and the axes thereof are disposed in a circular array concentric with the axis 67. These tubes communicate with the chamber 78 formed in the base of the heat exchanger. The upper ends of the tubes communicate with the chamber 79 formed in the head of the heat exchanger. Water at a temperature about 160° Fahrenheit, for example, is supplied from the engine cylinder head by way of the line 59 to the chamber 79. It passes downwardly through the tubes 77 into the chamber 78. It leaves chamber 78 through the line 53 to the water inlet side of the pump 29.

A thermo jacket is provided including a steel cylinder 81 co-axial with the insulator plate 76 but also including a domed portion 81a. This jacket usually extends at least three-quarters of the distance from the top of the heat exchanger to the base thereof. Immediately inside the jacket 81 is a fire and heat resistant insulating liner 82 which is co-axial with the jacket and also includes a pressure and heat resistant domed portion 82a. A circular bulkhead 83 is mounted to the inside of this liner immediately below the domed portion thereof and a lower bulkhead 84 is mounted to the liner adjacent the lower end thereof.

A fire and heat resistant and pressure supporting dome 86 is mounted to the bulkhead 83. A chamber 87 is thereby formed below the dome 86 and above the bulkhead 83 and receives exhaust gases from the pipe 34 which is sealed to both the upper and lower bulkheads 83 and 84. Exhaust gases are able to leave the chamber 87 by means of the fire tubes 88 mounted in the upper and lower bulkheads and discharging exhaust gas to the chamber 89 below the lower bulkhead and above the base 64.

The compartment 91 formed by the liner 82 and the bulkheads 83 and 84 receives water under pressure from the pump 29, the water entering by way of the line 54. This water is able to leave the compartment 91 by means of apertures 92 provided in the upper bulkhead 83.

The exhaust gas entering the chamber 87 may be at a temperature of 1000° Fahrenheit, for example, and upon entering the chamber 89 after passing through the tubes 88 may be at a temperature of 800° Fahrenheit for example. The exhaust gases are able to leave the chamber 89 by passing under the lower edge 81b of the thermo jacket 81 and passing upwardly around the tubes 77 and through a plurality of apertures 93 in the insulator tube 76. The exhaust gases then pass downwardly in the chamber between the tube 76 and plate 69 and enter the chamber 71 by passing through the apertures 94 in the wall 69.

During the course of passage through the heat exchanger from the exhaust pipe 34 to the apertures 94, the exhaust is considerably cooled and its volume substantially reduced. The gaseous portion thereof which has not been condensed is thus able to bubble upwardly through the water in the chamber 71 and depart by way of the line 62. Meantime, the water passing through the heat exchanger is heated and the water which is supplied under pressure from the pump in line 54 becomes superheated as it passes through the compartment 91 and enters the chamber 95. The manner of departure and employment of the superheated water will be described hereinafter.

The thermo safety valve 43 is a built-up assembly. It includes a body comprising the mounting block 96, the thermo insulator block 97, the bleed block 98, and the end pieces 99 and 101. All of these are held together by the screws 100 passing therethrough and threadedly received in the end plate 99. The blocks may either be precisely aligned by the use of separate dowel pins (not shown) or by the use of the screws in order to provide a continuous circular bore through the blocks 96, 97 and 98. This bore is a precision bore in which operate a water control valve spool 102 and oil control spool 103.

These spools may either be formed of one homogeneous piece of material or may be assembled together, but in either case they have a portion 104 of reduced diameter connecting them together and they move as a unit in the bore. A return spring 106 is provided between the oil spool and the end plate 101 and normally maintains the unit in its furthermost position toward the end plate 99 except when the spools are under the influence of other conditions which will be described hereinafter.

The threaded outlet 56a communicates with the bore and provides means for discharge of superheated water through the line 56 to the injectors (FIG. 1). The threaded port 47a communicates with the bore and provides means for receiving high pressure oil from the pump by way of the line 47. The cavity 51a communicating with the bore opens into a port (not shown) in the portion of the block 98 which has been cut away in the drawing and provides means for return of the oil through the line 51 to the reservoir 44.

An internally threaded aperture 110 is provided in the block 98. An apertured screw 110a is threadedly received in the aperture 110. A relief valve 107 is provided in the mounting block 96 and is normally loaded by the spring 108 which seats against one end of screw 110a. The other end of the screw may be formed to receive a tool such as a screwdriver or Allen wrench. A seal between this relief valve and the mounting block 96 is thereby provided between the conical surfaces 111 and 109 of the mounting block and valve respectively. The valve includes an actuator pin 112 extending into the bore 113 of the mounting block. It can be appreciated from the drawing, therefore, that a valved passageway is provided from the bore 113 through the mounting block, insulator block 97, bleed block 98, and end plate 101 to the thermo safety bypass line 57. This will be referred to as the safety bypass passageway.

The mounting block 96 has a stem 114 which is externally threaded and which is threadedly received in the cover and domed portion of the heat exchanger. The bore 113 thereof is smooth and receives the upper end portion of a thermally sensitive rod 116 which is threadedly mounted to the lower bulkhead 84 of the heat exchanger. A shoulder 117 of the rod rests on the upper surface 84a of the bulkhead 84 and firmly seats thereupon. Bushing 117a isolates the rod from the exhaust gas in chamber 87. The upper end of the rod 118 is free to move up and down in the bore 113 as the length of the rod changes resulting from thermal effects. The thermal state of the rod is determined by the effect of the water in contact therewith. A hexagonal wrench receiving socket 116a may be provided in the rod below the transverse plane at 116b to facilitate screwing the rod into the lower bulkhead.

Transverse passageways 119 and 120 are provided in the rod and intersect the longitudinal passageway 121 which opens into the upper end 118 of the rod. These passageways provide a large area of contact of water with the rod, and permit the departure of water from the super-heater chamber 95 into the bore 113 of the stem 114 and into the main horizontal bore of the safety valve 43. The extent of entrance of the water into the main bore is, of course, limited by the lands of the water spool and therefore, the water is confined to the annular chamber 112 between the lands 102a and 102b.

A pin 123 extends transversely through the stem 114 and supports the lever 124. This lever is, therefore, free to pivot on the pin in a plane common with the axes of the two bores of the valve 43 and stem 114. The lever 124 has a knob 126 at its upper end which is operable on the land 102a of the water spool. It also includes a shoulder 127. This shoulder is engageable by the upstanding lug 128 which is a portion of the rod 116 extending beyond the upper end 118 of the rod. It will be observed that the rod is severed in a transverse plane at 116b to facilitate dismounting of the body 96 without damage to lug 128. However, the lower end of the lever 124 can be made small enough to make it unnecessary to have a two piece rod.

When the rod 116 is cold, the lug 128 and shoulder 127 are engaged and the lever 124 is in the position shown. The starting position of the lever 124 can be adjusted by the use of selected thicknesses of washers at 130 between the top of the heat exchanger cover and the bottom face of the block 96. Another expedient which can be used is to provide selected thicknesses of washers at 116b between the upper and lower portions of the rod. Externally adjustable means with a different configuration of thermally sensitive element is also contemplated.

As the rod becomes heated and expands, the lug 128 pushes upwardly on the shoulder 127 to move the lever clockwise. The knob 126 thereof then moves the water spool to the right. As the temperature increases in the heat exchanger and the rod 116 expands, the water spool will eventually move to the point where the land 102a passes the edge of the port 56a. This opens the annular chamber 122 to the port 56a and allows water from chamber 95 of the heat exchanger to be discharged through the port 56a and line 56 to the injectors. If the temperature further increases to a sufficient degree, the forward edge 129 of the lever 124 will engage the valve pin 112 and move the valve 107 off its seat allowing water to escape through the safety bypass passageway and bypass line 57 to the outer chamber 71 of the heat exchanger. Valve 107 can also be opened by pressure in the bore 113. The pressure at which it opens can be adjusted by the screw. This safety feature prevents excessive pressure from building up in the chamber 95.

It was previously mentioned that high pressure oil from the pump 29 is supplied by way of the line 47 to the valve 43. This oil enters port 47a. It is stopped at this point unless the temperature of the rod 116 has caused the spools to move to the right to the extent that the annular groove 131 of the oil spool registers with the port 47a and the cavity 51a. When this registry occurs, some of the oil from the port 47a is allowed to bleed into the cavity 51a from which it can return to the reservoir 44. Thus, it is seen that as the temperature of the rod 116 increases, the amount of oil which can be bled from the line 47 increases. This controls the pressure available at the injector supply lines of the pump. As the temperature increases, the pressure, of course, decreases.

A pin 132 is mounted in the end block 99 and has head 133 thereon which is in position to engage the end of the water spool. This pin has a button 134 thereon which can extend into the operator's compartment of the vehicle in which the engine of this invention is to be employed. By pushing the pin 132, the operator can override the return force of the spring 106 and manually effect communication between the bore 113 of the stem and the port 56a. He can thus discharge superheated water from the heat exchanger into the injectors independently of the condition of the rod 116. This can momentarily provide extra surges of power in the engine. Therefore, this pin 132 is called the extreme power pin.

Referring to FIGS. 3 through 12 along with FIG. 1, the pump 29 will now be described. The pump includes a housing 136 in which a pair of ball bearings 137 and needle bearings 140 support a combined drive shaft and distributor member 138. The shaft can be supplied with splines 139 or a keyway or other suitable means by which to secure the pulley or sprocket 31. While the splines or key provide and maintain the proper index of the pulley on the shaft, the bolt 141 serves to secure the pulley to the shaft and also close the end of the axial drain passageway 142.

Figures 3, 4, 5, 6, 7, 8, 10:
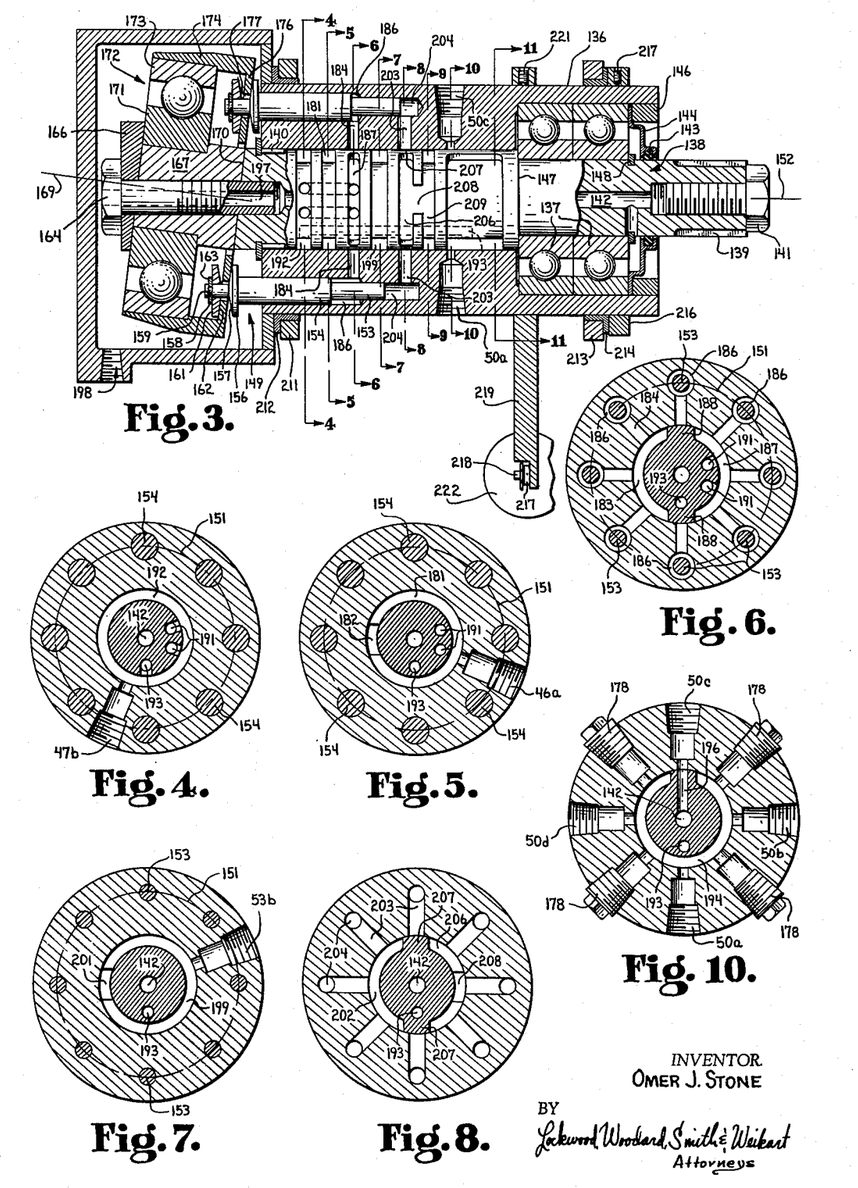
FIG. 3 is an enlarged vertical section through the pump of the present invention.
FIG. 4 is a section through the pump taken along the line 4—4 in FIG. 3, this being the portion of the pump from which high pressure oil is supplied to a safety valve.
FIG. 5 is a section through the pump taken along the line 5—5 in FIG. 3, this showing a portion of the pump which draws oil from the oil supply reservoir.
FIG. 6 is a section taken along the line 6—6 in FIG. 3, this showing the portion of the pump where oil pumping functions take place, where at any one time, a portion of the cylinders are operating in a suction condition and a portion of the cylinders are providing pressure.
FIG. 7 is a section taken along the line 7—7 in FIG. 3, and showing the portion of the pump where water is admitted from the heat exchanger.
FIG. 8 is a section taken along the line 8—8 in FIG. 3, showing the portion of the pump where the water pumping action takes place, with a portion of the water pumping pistons operating in a pressure stroke and a portion of the pistons operating in a suction stroke.
FIG. 10 is a section taken along the line 10—10 in FIG. 3 showing a portion of the pump from which high pressure oil is distributed to the injectors and whereby oil can flow back from one injector at a time.

An oil seal 143 is mounted in the retainer 144 and seals the shaft. The seal retainer and bearings are retained in the housing by means of the retainer ring 146 which is press fit into the housing. The axial positioning of the shaft with respect to the housing is maintained by the shoulder 147 on the shaft and the snap ring 148 on the shaft, with the inner races of the bearings being snugly engaged therebetween.

A circular array of piston assemblies 149 is provided. In the embodiment illustrated, there are eight piston assemblies equally spaced around a circle 151 whose center is on the axis 152 of the pump shaft and housing. Each piston assembly may be considered to have a forward piston 153 for pumping water and a rear piston 154 for pumping oil. The water piston and oil piston are integral and a flange 156 is provided at the rear end thereof having a conical surface 157 on the rear face thereof. This surface is at an angle of approximately 7° with respect to a plane normal to the axis of the piston and provides a driving surface for the driving of the pistons. Each piston also has a stem 158 extending rearwardly of the flange 156 and having a groove 159 therein. A washer 161 is mounted on the stem 158 and has a conical face 162 identical to the face 157 of the flange 156. The washer is retained in place by the snap ring 163.

An apertured bolt 164 and tapered washer 166 secure the cylindrical block 167 to the slanted rear end face 170 of the straight portion of the shaft 138. The axis 169 of the block intersects the axis 152 of the shaft at an angle of approximately 7°. This block provides the mount for the inner race 171 of the ball bearing 172 whose outer race 173 supports the piston drive shell or ring 174. Piston drive shell 174 is press fit onto the outer race 173 of the bearing. It includes an inwardly turned flange 176 having a plurality of apertures 177 therein arranged in a circle. The piston stems 158 are received in the apertures 177 and sufficient clearance is provided for a wobble action of the ring on the stems of the various pistons. It will be readily recognized, therefore, that as the shaft 138 rotates, a wobbling action of the ring 174 will be achieved which is effective to drive the pistons in reciprocating action. While the shaft 138 and block 167 are illustrated as separate pieces, this two piece construction is not essential and an angled mount and shaft proper can be a one piece unit.

It is desirable that the washers 161 on the piston stems be a light press fit thereon so as to prevent rattling and slippage on the stems.

Oil for pumping by the pistons is supplied from the reservoir 44 through the line 46 to the port 46a (FIG. 5). High pressure oil from the pump to the line 47 is available at the port 47b (FIG. 4). Water from the final preheat stage in the heat exchanger 33 is provided by the line 53 to the pump and enters port 53b (FIG. 7). This water is discharged from the pump through the port 54b (FIG. 9) to the line 54 returning to the heat exchanger 33. High pressure oil is supplied to the various injectors by the injector feed lines 52a, 52b, 52c, and 52d. The oil to these feed lines is available at the ports 50a, 50b, 50c, and 50d (FIG. 10). The letter post scripts correspond to the feed lines which are connected to the ports.

Figures 9, 11:
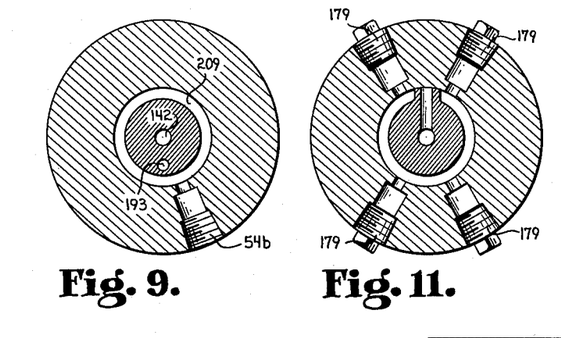
FIG. 9 is a section taken along the line 9—9 in FIG. 3 and showing a portion of the pump where high pressure water is discharged from the pump.
FIG. 11 is a section taken along the line 11—11 in FIG. 3 and showing additional ports located at the proper relationship for use in cooperation with two of the ports in FIG. 10 for distribution to injectors in a six cylinder engine.

The ports 178 in FIG. 10 and 179 in FIG. 11 are provided for use when the pump is to be employed with an engine having a number of cylinders other than four. For example, in an eight cylinder engine, all of the ports shown in FIG. 10 would be employed, and each would be connected to an injector. In a six cylinder engine application, the four ports shown in FIG. 11 would be used in combination with the ports 50b and 50d of FIG. 10.

For the handling of the fluids in the pump, the shaft is provided with a number of distribution lands and passageways, the arrangement and purposes of which will now be described. Oil entering the pump through the port 46a enters the arcuate groove 181 which is the oil suction groove of the shaft. A break 182 in the front wall of groove 181 provides communication between the oil suction groove 181 and the arcuate groove 183 of the shaft, which is shown in FIG. 6. The groove 183 is shown in a position to communicate with the ports 184 extending radially inwardly from the oil cylinders 186 of the pump. On the opposite side of the shaft from the groove 183 is a pressure groove 187. This groove is identical to groove 183, being separated therefrom by the lands 188. By having the suction and pressure grooves 183 and 187 so arranged, the oil cylinders in which the pistons are on their pressure stroke are in communication with the pressure groove 187 whereas the oil cylinders in which the pistons are on their suction stroke are in communication with the groove 183. A pair of oil pressure passageways 191, communicating with groove 187, extend parallel to the axis of the shaft and communicate with the annular groove 192 in the shaft. Accordingly, high pressure oil is provided in the groove 192 and is available at port 47b as illustrated in FIG. 4. Any leakage of high pressure oil from this area toward the rear of the pump housing is available to lubricate the rear support bearings 140.

A long oil passageway 193 extends parallel to the axis of the shaft and provides communication between the groove 192 and the arcuate oil distribution groove 194 (FIG. 10). The groove 194 thus contains high pressure oil which is available to any of the discharge ports which are at any one time in communication with this groove. Because groove 194 extends a substantial distance around the circumference of the shaft, the high pressure oil is available at all of these ports except one at all times. Accordingly, oil at the same pressure as is provided in the line 47 to the safety valve 43 is also available at three of the four lines 52a through 52d. The pressure of this oil is limited by the pressure regulator valve 48 or by bleeding in the safety valve 43.

As is shown in FIG. 10, the port 50c is in registry with a back flow slot 196 in the shaft. This slot communicates with the central axial passageway 142 which extends the length of the shaft. This construction allows oil which may flow back from an injector to pass through the shaft and through the hole 197 in the bolt 164 and into the rear housing of the pump. In this area, it can provide lubrication for the various parts housed therein and then any excess oil can flow back to the reservoir through the drain port 198. The manner and purpose of allowing backflow from the injectors will become apparent as the description proceeds.

The provision for water pumping will now be described.

As was previously mentioned, water from the exchanger 33 is conveyed by the line 53 to the port 53b of the pump. This water enters the groove 199 in the shaft (FIG. 7). A break 201 is provided in the front wall of the groove 199 thereby providing communication between groove 199 and the groove 202. Groove 202 (FIG. 8) is in position to register with the radial passageways 203 extending to the water cylinders 204. Water is thereby supplied to any of the cylinders whose corresponding radial passageway 203 is at any time in communication with the groove 202. The grooves 202 and 199 and the opening 201 connecting them, are therefore, water suction passageways.

In the half of the shaft opposite the groove 202, a water pressure groove 206 is provided. The pressure and suction grooves are separated by the lands 207. A break 208 in the front wall of the groove 206 extends into the water pressure groove 209. The groove 209 (FIG. 9) extends completely around the shaft. Therefore, at all positions of the shaft, water under pressure in the groove 209 communicates with the discharge port 54b from which it can be conveyed through the line 54 back to the heat exchanger 33. As in the case of the oil suction and pressure grooves of the shaft, the water suction and pressure grooves 202 and 206 in FIG. 8 are properly indexed with respect to the slanted end face 170 of the shaft and they are thereby at a proper index with respect to the pump piston drive ring. Therefore, the pressure groove will be in communication with water cylinders in which the pistons are being forced toward the front of the pump to expel the water. At the same time, the suction groove 202 is communicating with the water cylinders in which the pistons are being drawn to the rear of the pump to draw water into them. At the same time, in those two cylinders where the motion of the pistons is reversing, the lands 207 will be covering the ports 203 corresponding to the cylinders. Because water moves both directions in passageways 203, they may be referred to as shuttle passageways.

It is desirable to mount the pump so that it can be rotated to some extent in response to manifold vacuum, in a manner similar to the rotation of the conventional ignition distributor with response to manifold vacuum. Such a mounting is shown schematically and may include a generally circular mounting bracket or ring 211 affixed to the engine block and having a bushing 212 therein which is flanged to provide axially as well as radial support for the pump housing. Another bracket ring 213 is mounted to the engine block and has a bushing 214 therein encompassing the front portion of the pump housing. A lock ring 216 is secured to the pump housing by means of the set screw 217 and this engages the flange of the bushing 214. Accordingly, the axial location of the pump housing may be maintained by the bushings while the housing is free to rotate therein.

The rotational position of the housing is maintained by a rod 217 which is connected by the pin 218 to the arm 219 which is secured by ring bracket and set screw 221 to the pump housing. The rod 217 is operated by the vacuum advance unit 222 and can be considered connected to a diaphragm therein. The vacuum advance unit is connected in the usual manner to a portion of the carburetor or intake manifold of the engine. Accordingly, a slight rotational movement of the pump as controlled by the manifold vacuum can be obtained to advance and retard the injection of superheated water into the cylinders of the engine. The water and oil lines connected to the pump can be sufficiently flexible to accommodate this action.

Figure 12:
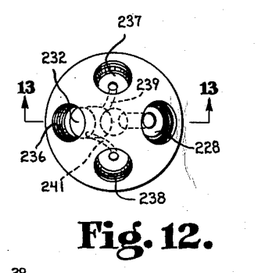
FIG. 12 is an enlarged top plan view of an injector according to the present invention.
Figure 13:
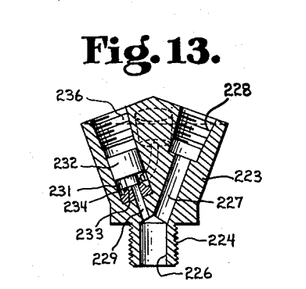
FIG. 13 is a section thereof taken along the line 13—13 in FIG. 12.

Referring to FIGS. 12 and 13, details of the injector are shown. FIG. 12 is a top plan view thereof while FIG. 13 is a vertical section taken along the line 13—13 in FIG. 12. The injector includes a body 223 having a threaded cylindrical stem 224 extending downwardly therefrom by which the injector is secured to the cylinder head in the spark plug port thereof. The bore 226 communicates through a passageway 227 to a first threaded opening 228 in which is received the spark plug. A second passageway 229 communicating with the bore 226 communicates with the bore 231 in which the piston 232 is fitted. The lower face 233 of the piston can engage the valve seat 234 to block the passageway 229 at the entrance to the cylinder 231 under certain circumstances which will be described. The threaded port 236 is provided for application of oil under pressure from the pump and reaching the port through one of the high pressure lines from the pump. Which of the lines is connected to the injector depends, of course, on which cylinder the injector serves.

An additional threaded port 237 is provided for connection to one of the branches leading to the injector from the superheated water line 56. A fourth threaded port 238 is provided for initial bleeding of the hydraulic system during manufacture of the engine or upon replacement of an injector if ever required. A standard plug is installed in the opening 238 because in the operation of the engine, it is not necessary to have any bleeding action from this port. A passageway 239 is provided between the port 237 and the portion of the cylinder 231 below the piston 232. A passageway 241 is provided from the port 238 to the cylinder or bore 231 above the piston 232.

It should be understood that the present invention can be employed in diesel engines as well as spark ignition engines. In the case where it is employed with a diesel engine, the usual diesel fuel injector is employed in the threaded opening 228 rather than the spark plug.

Figure 14:
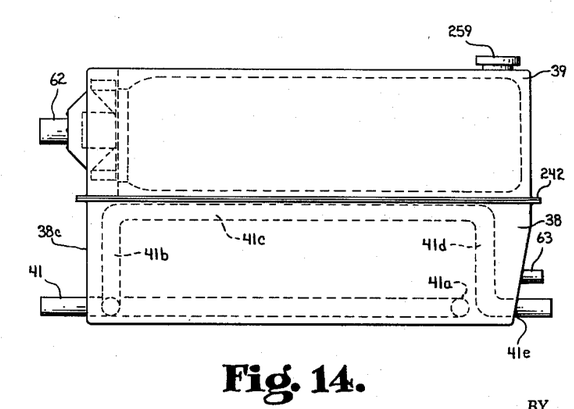
FIG. 14 is an enlarged side elevation of the combined filter and freeze tank of the present invention.
Figure 15:
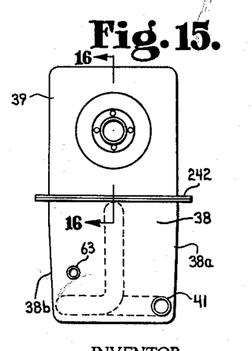
FIG. 15 is an end view thereof.
Figure 16:
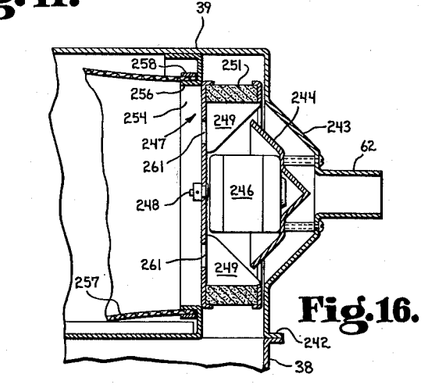
FIG. 16 is an enlarged fragmentary section along the line 16—16 in FIG. 15.

Referring now to FIGS. 14, 15, and 16, the combined filter and freeze tank is presented. The thaw line 41 of FIG. 1 enters the freeze tank 38 which is merely a container having four walls and a bottom and capable of holding water. The thaw line extends forward in the tank adjacent the right hand wall 38a thereof and then extends across in portion 41a to the left hand wall 38b of the tank. It continues to the rear wall 38c of the tank and back toward the center of the tank and then rises at portion 41b to the top of the freeze tank and then extends forwardly in portion 41c toward the front. It turns downwardly at 41d to its point of departure 41e from which it extends to the top tank 22 of the radiator.

It will be recognized, therefore, that if water has collected in the freeze tank and frozen, the hot exhaust can be directed through the thaw line into the top tank of the radiator from which it is discharged through the radiator cap. This hot exhaust is effective to quickly melt the ice in the freeze tank.

The filter chamber 39 is mounted to the freeze tank by means of flange 242 which can either be bolted or clamped readily to the corresponding flange of the freeze tank. The filter housing has an entrance dome 243 into which water and vapor from the heat exchanger as well as gases therefrom enter by way of the pipe 62. A conical baffle 244 is secured to the dome and an electric motor 246 is secured to the baffle. A combination impeller and filter wheel 247 is mounted to the motor shaft 248 and includes impeller blades 249 and a plurality of filter segments 251 extending in a cylindrical arrangement co-axial with the axis of the shaft 248.

An opening 254 is provided adjacent the shaft end of the motor and has a flange 256 to which a filter bag 257 is secured by means of the circular clamp 258. This bag extends the length of the filter chamber and is sufficiently perforate as to allow gases to escape while retaining carbon and any other foreign particles. A pressure cap 259 mounted at the opposite end of the filter chamber permits the gases to leave the chamber.

While it may not be necessary to operate the impeller wheel at all times, it may be necessary at some times, and the blades 249 are so shaped as to cause an axial flow through the apertures 261 into the bag 257.

This operation will cause moisture particles to collect on the filter pads 251 while the gases themselves are moved axially into the filter bag. This prevents any problem of accumulated moisture in the bag.

It will be observed in FIG. 1 that a set of dotted and dashed lines extends into the freeze tank from various parts of the apparatus illustrated. These are drain lines for draining all water from the system into the freeze tank such as may be required in sub-freezing weather when the engine is to be inoperative for an extended period of time. A single knob 262 mounted to the instrument panel can be connected by a series of wires to valves on each of these lines so that the knob, when pulled, opens all of the lines to drain them into the freeze tank. In this manner, any possibility of damage due to freezing is eliminated. Also, electrical heating elements can be employed in the pump for cold weather thawing there if desired.

For a description of the operation of the invention, let it first be assumed that the system is operating in sub-freezing temperatures, and, therefore, the water drain knob has been operated to drain all of the water from the system into the freeze tank where it has frozen. It will be readily recognized that drain lines other than those specifically illustrated can be added where desirable to assure that water will be drained from any location where it could possibly cause trouble.

The engine is started in the usual manner but the valve 42 in the main exhaust pipe 34 is turned to the position shown in FIG. 1 whereby all of the exhaust is passed through the thaw line 41 and through the freeze tank and into the top tank of the radiator. From this point, it is able to pass through the radiator cap 21 to atmosphere. After a short period of operation, the water in the freeze tank will have thawed, whereupon it is able to enter the radiator by means of the line 63. Of course, the pump will be establishing a vacuum in the water line 53 from the heat exchanger. This will establish a vacuum in the water line 59 from the cylinder head. Accordingly, a vacuum will be established in the line 58 from the heat exchanger which will in turn establish a vacuum in the line 61 between the radiator and heat exchanger. In this manner, the flow of water from the radiator through the pump will be established after a short period of operation.

The water discharged from the pump in the line 54 will enter the heat exchanger and pass upwardly into the chamber 95 thereof whereupon it will rise through the rod 116 into the annular chamber portion 122 of the water spool in the bore of the thermosafety valve. It will be stopped at this point until such time as the temperature in the heat exchanger rises to a level where the rod 116 will move the water control spool to allow discharge of water through the port 56 and into the superheated water line 56 to the injectors. Meanwhile, there will be no heat applied to the heat exchanger because all of the exhaust is passing through the freeze tank. Also, the pump is applying oil under pressure by way of the line 47 to the port 47a of the thermosafety valve where the oil is stopped by the oil spool 103. Oil under pressure is also being applied through the lines 52a through 52d to the injector heads whereby it is holding the pistons 232 on the valve seats preventing any water from entering the cylinders through the injectors.

When the ice in the freeze tank has thawed, the valve 142 in the exhaust pipe can be opened to block the flow through the thaw line and allow all of the exhaust to flow through the heat exchanger. Heating of the water therein begins.

The construction of the heat exchanger is such that the hottest portions thereof are in the center and the cooler portions are toward the outside. Because of this construction feature and because of the use of insulators at strategic locations, the heat loss in the heat exchanger is negligible. The high exhaust heat entering will be used and carried away by the functions of the surrounding compartments as the heat radiates outwardly. Eventually, the point is reached where the coolest water in system is the water flowing from the radiator through the line 61 to the heat exchanger. This water receives some heat during passage upwardly through the tubes in the heat exchanger and may be elevated from a temperature of 80° Fahrenheit, for example, to 120° Fahrenheit. This warmed water enters the cylinder block of the engine where it picks up additional heat. By having the water entering the cylinder block slightly warmed, there is no chance of the engine operating at an undesirably low temperature.

The water leaving the cylinder head by the line 59 enters the final water pre-heat portion of the heat exchanger at a temperature of approximately 160° Fahrenheit, for example. It leaves the final water pre-heat portion through the line 53 to the suction side of the pump. In the pump, the water pressure is raised substantially and returned by the line 54 to the heat exchanger where it enters the superheater portion thereof. There, it is subjected to exhaust gas temperatures of the order of approximately 800° Fahrenheit, for example. It had previously been subjected to an exhaust gas temperature ranging from approximately 800° Fahrenheit down to 300° Fahrenheit, for example, as the exhaust gases rose in the final preheat chamber.

As the water in the superheater rises to the chamber 95, it is subjected to temperatures of the order of 900° near the upper bulkhead 83 whereas the water near the main exhaust pipe 34 in the heat exchanger may be subjected to temperatures nearer 1000° Fahrenheit, for example. Accordingly, the water in the superheater chamber 95 may reach a temperature approaching 700° Fahrenheit and a pressure of approximately 3000 lbs. per square inch. By the time the water has reached or approached this condition, the rod 116 will have expanded sufficiently to vent the water in the bore 113 of the thermosafety valve to the port 56 from which it is supplied to all of the injectors. It should be understood, of course, that best results are obtained by suitably insulating the lines from the valve 43 to the injectors.

It will be remembered from description of FIG. 10, that when the backflow slot 196 of the pump shaft registers with any of the ports connected to one of the injectors, the oil pressure in the corresponding injector will drop. In this event, the pressure of the superheated water under the piston 232 in the injector will cause the piston to leave its seat allowing the superheated water to enter the passageway 229 and accordingly enter the engine cylinder.

Therefore, operation of the pump is effective not only to maintain circulation and pressure of water in the system, but also controls the admission of superheated water to the various engine cylinders. It follows, therefore, that the admission of superheated water will be precisely in time with the operation of the engine and can be advanced or delayed to an extent determined by the operation of the vacuum advance diaphragm. Also, in view of the fact that admission of superheated water into the cylinders depends on the state of pressure on opposite sides of the piston 232 in the injector head, a low hydraulic pressure for a prolonged period of time will permit admission of superheated water for a prolonged period of time. Therefore, by suitable bleeding means in the oil system, the duration of injection can be controlled.

However, it should be noted at this point that in the pump itself, the oil pressure is always maintained at least 100 lbs. per square inch higher than water pressure. In this manner, proper lubrication is always assured and any leakage which may possibly develop will tend to improve lubrication rather than interfere with lubrication. Likewise, the fact that the pump receives only hot water and not superheated water tends to prolong the pump life.

If the temperature of the water could possibly get too great, the thermosensitive rod 116 will be responding to the conditions which could make the water temperature too high and will open the valve 107 in the thermosafety valve 43. This will allow discharge of water from the chamber 95 through the line 57 into the outer chamber 71 of the heat exchanger whereupon the heat and pressure will be dissipated safely.

At some point prior to the time the lever 124 could open the valve 109 and after the time the water is able to pass from the chamber 96 to the injectors, the groove 131 in the oil spool will permit oil from the line 47 to enter the groove 51a from which it can return through the line 51 to the reservoir 44. This oil bleed effect will, therefore, cause a reduction in pressure in the line 47 proportional to the amount of bleeding which takes place. Accordingly, in view of the fact that the axial passageway 193 in the pump shaft communicates between the groove 192 supplying the pressure to the line 47 and the groove 194 applying pressure to the various injectors, the oil pressure applied to these injectors will also be reduced by an amount depending on the extent of bleeding which takes place in the thermosafety valve. This pressure reduction will tend to increase the duration of injection of superheated water into the engine cylinders because it will take less water pressure to open the valves in the injectors, and the opening which occurs when the backflow slot registers with the oil line feeding an injector will occur sharply.

It is possible for the oil pressure to drop to a point whereby injection into the cylinders would be practically continuous. This would occur if the pressure were low enough that it did not require registry of the backflow slot with a feed line to allow the water pressure to open the injector head valve. The selection of diameters and port relationships can be made according to the particular installation such as to insure maximum efficiency by holding the system at its highest safe temperature and pressure. Upon exceeding the safe temperature or pressure, the thermosafety valve bypass will open. The system can be built to withstand the highest pressure which can develop.

The oil bleed valve spool effects a water quantity control by allowing bleeding of more oil as the temperature causes the two spools to move toward the end plate 101 of the thermosafety valve. The larger the quantity of oil being bled off in the thermosafety valve, the longer the injection valve will stay open and the larger will be the injection of superheated water. The bleeding off also compensates for speed variation. The higher the speed, the more heat builds up in the heat exchanger which in turn cause the lever 124 to move the spools to a greater degree. This reduces the hydraulic pressure and provides more time for superheated water to get into the engine cylinder.

The extreme power pin provides means for increasing power tremendously for a short period of time by using more superheated water than would ordinarily be used by the automatic control. The extreme power pin, when pushed in all the way, allows injection to take place over the full length of the power stroke or just prior to opening of the exhaust valves in the engine. Unless the extreme power pin is pushed in, no water can be injected into the cylinders until heated to an efficient operating temperature. This is because the water spool blocks the port 56a. The screw 110a can be used to adjust the tension of the spring 108 whereby the pressure required in the chamber 95 to open the valve 109 can be adjusted to the desired level.

In the use of the present invention, the usual engine thermostat in the block can be left in place so long as it is one of the 160 to 180° opening variety. If laws will not permit a maximum water pressure of 3200 lbs. per square inch or temperature of 700° Fahrenheit, the components can be adapted readily to operation under conditions which laws will permit.

If desired, an oil filter can be used in the reservoir 44 and this may be any well known low pressure oil filter having a one quart capacity and vented. It is even possible that where the engine lubricant has suitable hydraulic characteristics, it could be used in the system described in this invention. However, at least for the present, it will probably be necessary to keep the engine oiling system separate from the system of the present invention.

As was previously mentioned, a standard radiator can be used with a 1 to 7 lbs. per square inch pressure cap on the radiator The cowling between the carburetor and the radiator is used to assure a flow of air through the radiator to the carburetor. However, if a fan is used, the cowling is not necessary. There is no need for a separate engine water pump inasmuch as the pump of the present invention provides the circulation needed through the engine.

From the foregoing description, it can be appreciated that the maximum possible use of the normally unused thermal energy of an internal combustion engine is effected by the present invention. Moreover, the invention provides means for improving the combustion process in an engine by injecting superheated water into the engine cylinders In addition to the improvements of the efficiency which can be attained by the present invention, the problem of pollution of the atmosphere is minimized, if not entirely eliminated, both by the improved combustion achieved and by the handling of exhaust products.

Accordingly, the present invention can achieve the objects set out above as well as providing advantages and achieving other objects not specifically mentioned.

Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An engine comprising: a block having a combustion cylinder therein and a power output shaft mounted for rotation therein; a power piston located in said cylinder and coupled to said shaft for driving said shaft; an injection head mounted to said block and including a passageway communicating with said cylinder, said passageway including a first valve therein and including a fluid inlet port associated said first valve: pumping means driven by said shaft; first and second separate fluid supply means coupled to said pumping means, said pumping means having a first output means coupled to said inlet port of said injection head to supply a first fluid thereto and said pumping means having a second output means coupled to said passageway in said injection head to supply a second fluid thereto, the fluid supplied by said first output means functioning at said injection head to hold said first valve closed to prevent fluid from said second output means from entering said cylinder through said passageway in said injection head, and means coupled to said first output means to influence the control by said output means of said first valve in said injection head.

2. An engine as set forth in claim 1 wherein said control means coupled to said first output means includes temperature and pressure sensitive means coupled to said second output means and responsive to pressure and temperature in said second output means to relieve pressure in said second output means.

3. An engine as set forth in claim 1 which further comprises: a heat exchanger coupled to said second output means and to said cylinder to receive exhaust products from said cylinder for transmitting heat therefrom to the fluid in said second output means, a second valve coupled to said heat exchanger and controlling passage of said second fluid from said heat exchanger to said injection head, and a thermosensitive device operably associated with said second valve to respond to temperature increases to open said second valve, said thermosensitive device being in thermal communication with said second fluid in said heat exchanger.

4. An engine as set forth in claim 2 wherein: said pressure sensitive means includes a bypass valve operable by a predetermined pressure in said second output means to open and relieve pressure in said second fluid, and said temperature sensitive means includes a member operatively engaging said bypass valve upon sensing predetermined temperature, to thereupon open said bypass valve.

5. An engine as set forth in claim 3 wherein said control influencing means includes a third valve connected to said second valve and operable therewith by said thermosensitive device to reduce pressure in said first output means.

6. An engine comprising a block having combustion cylinders therein and a crank shaft mounted for rotation thereon; pistons disposed in said cylinders and linked to said crank shaft for drivingly rotating said crank shaft; an injection head mounted to said block and communicating with one of said cylinders; pumping means driven by said crank shaft and having fluid discharge means coupled therefrom through a coupling means to said injection head; a sump; and means returning fluid to said sump from said pumping means and from said coupling means and from said injection head by gravity flow when said pump is at rest; and an exhaust system coupled to said cylinders and coupled to said sump for thawing solidified fluid collected in said sump.

7. The engine as set forth in claim 6 wherein said exhaust system includes a bypass with a selective valve therein to allow passage of exhaust products through said sump and alternately pass exhaust around said sump for selectively bypassing said sump.

8. A liquid cooled engine comprising a cylinder block having combustion cylinders therein and having an output shaft mounted thereon; power pistons coupled to said output shaft for drivingly rotating said output shaft; a plurality of water passages in said cylinder block for the cooling thereof; a cooling radiator; a water pump driven by said output shaft; a water system including in circuit said pump, said radiator, said cylinder block, and a heat exchanger; and an exhaust system coupled to said cylinders and coupled to said radiator for discharging exhaust products through said radiator.

9. An injection head for an internal combustion engine comprising: a body having a threaded stem with an opening in its end communicating with a passageway therein; a first threaded receptacle in said body communicating with said passageway and having internal threads and thereby adapted to receive a spark plug; a bore in said body; a first port in said body communicating with said bore; a valve seat in said bore between said port and said passageway; a valve member in said bore and isolating said port from said valve seat and movable to seat on said valve seat to prevent communication between said bore and said passageway; a second port isolated from said first port by said valve member and communicating with said bore to accommodate the passage of fluid from said second port into said passageway when said valve member is unseated.

10. The injection head of claim 9 further comprising: a third port in said body portion and communicating with said first port to provide means for bleeding said first port.

11. An engine comprising: a block having a combustion cylinder therein and a power output shaft mounted for rotation therein; a power piston located in said cylinder and coupled to said shaft for driving said shaft; an injection head mounted to said block and including a body having an injection passageway communicating with said cylinder, a bore in said body, a first port in said body communicating with said bore, a valve seat in said bore between said port and said passageway, a valve member in said bore and isolating said port from said valve seat and movable to seat on said valve seat to prevent communication between said bore and said injection passageway, a second port in said body and isolated from said first port by said valve member and communicating with said bore to accommodate passage of fluid from said second port into said passageway when said valve is unseated; a first fluid and a second fluid; pumping means driven by said shaft, said pumping means having a first fluid pumping path and a second fluid pumping path with said first path being separate from said second path, and a first discharge port for said first path and a second discharge port for said second path; a heat exchanger; a fluid sump; an exhaust system coupled to said cylinder and to said heat exchanger for directing exhaust products through said heat exchanger and having a valve therein for alternatively directing exhaust products through said sump; means coupling said second discharge port through said heat exchanger to said second port in said injection head for supplying said second fluid from said second pump path into said injection passageway; means coupling said first discharge port to hold said valve member seated in said injection head to prevent fluid from said second discharge port from entering said cylinder through said passageway in said injection head; and control means including a bleed valve coupled to said first pumping path, said control means further including thermosensitive means thermally communicating with said second fluid in said heat exchanger and responsive to increases in temperature therein to open said bleed valve for reducing pressure in said first pumping path and facilitating the unseating of said valve member and passage of said second fluid from said bore through said injection passageway into said cylinder.

12. The engine of claim 11 wherein said control means further includes: a control valve in said means coupling said second discharge port to said second injection head port to prevent flow of said second fluid in said coupling means, said control valve being operable by said thermosensitive means to allow flow of said second fluid in said coupling means.

13. An engine comprising: a block having a combustion cylinder therein and a power output shaft mounted for rotation therein; a power piston located in said cylinder and coupled to said shaft for driving said shaft; an injection head mounted to said block and including a body having an injection passageway communicating with said cylinder, a bore in said body, a first port in said body communicating with said bore, a valve seat in said bore between said port and said passageway, a valve member in said bore and isolating said port from said valve seat and movable to seat on said valve seat to prevent communication between said bore and said injection passageway, a second port in said body and isolated from said first port by said valve member and communicating with said bore to accommodate passage of fluid from said second port into said passageway when said valve is unseated; a first fluid and a second fluid; pumping means driven by said shaft, said pumping means having a case with a plurality of stepped diameter bores therein disposed parallel to each other and spaced around an axis, each of said stepped bores thereby providing multiple coaxial pump cylinders of two different diameters; a stepped diameter piston slidably received in each said stepped bores, thereby providing two variable volume chambers for each stepped bore; a rotor in said casing mounted for rotation therein and driven by said engine output shaft and having an oblique end thereon; a block secured to said end and having a bearing mounted thereto with an outer race mounted for rotation thereon; a drive flange mounted to said outer race of said bearing and having a plurality of apertures therein aligned with the pump cylinders in said case; means connecting said stepped pistons to said drive flange and accommodating rocking of said flange with respect to said pistons; a first set of shuttle passageways disposed in said case and communicating with one set of said chambers to handle said first fluid; a second set of shuttle passageways disposed in said case and communicating with another set of said chambers to handle said second fluid; a first inlet passageway in said case to admit said first fluid; a second inlet passageway in said case to admit said second fluid; a first set of discharge passageways in said case to discharge said first fluid; a second fluid discharge passageway in said case for said second fluid; a first set of rotor passageways in said rotor communicable with said first set of shuttle passageways and with said first inlet passageway and with said first set of discharge passageways as said rotor rotates in said case to provide a first fluid pumping path; and a second set of rotor passageways in said rotor, said second set of rotor passageways being communicable with said second set of shuttle passageways, and with said second inlet passageway and with said second fluid discharge passageway as said rotor rotates to provide a second fluid pumping path, with said first path being separate from said second path, and a first discharge port communicating with a discharge passageway of said first set and a second discharge port communicating with said second fluid discharge passageway; a heat exchanger; a fluid sump; an exhaust system coupled to said cylinder and to said heat exchanger for directing exhaust products through said heat exchanger and having a valve therein for alternatively directing exhaust products through said sump; means coupling said second discharge port through said heat exchanger to said second port in said injection head for supplying a fluid from said second pump path into said injection passageway; means coupling said first discharge port to said first port in said injection head to hold said valve member seated in said injection head to prevent fluid from said second discharge port from entering said cylinder through said passageway in said injection head; and control means including a bleed valve coupled to said first pumping path, said control means further including thermosensitive means thermally communicating with said second fluid in said heat exchanger and responsive to increases in temperature therein to open said bleed valve for reducing pressure in said first pumping path and facilitating the unseating of said valve member and passage of said second fluid from said bore through said injection passageway into said cylinder.

14. The engine of claim 13 wherein said control means further includes: a control valve in said means coupling said second discharge port to said second injection head port to prevent flow of said second fluid in said coupling means, said control valve being operable by said thermosensitive means to allow flow of said second fluid in said coupling means.

15. The engine of claim 14 further comprising: a radiator; a carburetor communicating with said combustion cylinder; a conduit conveying air from said radiator to said carburetor; and filtration means coupled between said heat exchanger and said radiator for filtering exhaust products, said exhaust system being coupled to said radiator to permit passage of exhaust products to said radiator.

16. An engine comprising: a block having combustion cylinders and water passages therein; an output shaft mounted in said block for rotation therein; power pistons in said cylinders and coupled to said output shaft for transmitting power thereto; an injection head mounted to said block and having a fluid inlet port communicable with one of said cylinders; a pump driven by said shaft; a radiator; an exhaust system coupled to said cylinders; and a heat exchanger comprising base means; cover means; first and second upstanding shells connected to said base and cover means thereby providing a first chamber therebetween, said chamber being coupled through a filter to said radiator; a third shell disposed between said base and cover means and inwardly of said second shell to provide a second chamber; a first plurality of water tubes in said second chamber, said tubes being coupled to said radiator to receive water therefrom and coupled to said water passages to supply heated water thereto; a fourth shell connected to said cover and disposed inwardly of said third shell to provide a third chamber; a second plurality of water tubes in said third chamber, the tubes of said second plurality being coupled to said water passages to receive heated water therefrom and coupled to said pump to supply further heated water thereto; upper and lower bulkheads extending across the interior of said fourth shell forming a fourth chamber; a first dome joined to said fourth shell and extending thereover; a second dome joined to said upper bulkhead inwardly of said fourth shell and above said upper bulkhead to provide a first domed chamber between said first dome and said second dome and to provide a second domed chamber between said second dome and said upper bulkhead; a main exhaust tube coupled to said exhaust system and extending through said fourth chamber and opening into said second domed chamber; a plurality of exhaust tubes having inlets in said second domed chamber and extending through said fourth chamber and having outlets communicating with said third chamber, said second and third shells having apertures therein to accommodate passage of exhaust products from said third chamber to said first chamber; a feed tube coupled to said pump and entering said fourth chamber to feed pressurized water thereto; and aperture means in said upper bulkhead providing communication between said fourth chamber and said first domed chamber to admit water from said fourth chamber to said first domed chamber; and an outlet from said first domed chamber; and water control valve means coupled to said outlet and to said fluid inlet port of said injection head; and thermosensitive means in said heat exchanger and operatively connected to said control valve means to open said control valve means for supplying superheated water to said injection head.

References Cited by the Examiner
UNITED STATES PATENTS

| | | | |
|---|---|---|---|
| 966,805 | 8/10 | Dawson | 123—25 |
| 1,626,335 | 4/27 | Farnham | 123—25 |
| 1,727,860 | 9/29 | Carlson | 123—25 |
| 1,730,182 | 10/29 | Wheeler. | |
| 2,217,459 | 10/40 | Spanner | 122—7 |
| 2,397,594 | 4/46 | Buchaan | 103—173 |
| 2,518,619 | 8/50 | Huber | 103—173 |
| 2,686,502 | 8/54 | Tesch | 123—25 |
| 2,697,421 | 12/54 | Nalven | 122—7 |
| 2,812,749 | 11/57 | Peters | 123—25 |

RICHARD B. WILKINSON, *Primary Examiner.*

JULIUS E. WEST, *Examiner.*